(12) United States Patent
Chandra et al.

(10) Patent No.: US 10,169,194 B2
(45) Date of Patent: Jan. 1, 2019

(54) MULTI-THREAD SEQUENCING

(71) Applicant: INTERNATIONAL BUSINESS MACHINES CORPORATION, Armonk, NY (US)

(72) Inventors: Vikas Chandra, Bangalore (IN); Srinivasan S. Muthuswamy, Bangalore (IN); Sarika Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/466,191

(22) Filed: Mar. 22, 2017

(65) Prior Publication Data
US 2018/0276102 A1     Sep. 27, 2018

(51) Int. Cl.
*G06F 11/36*     (2006.01)

(52) U.S. Cl.
CPC .................................. *G06F 11/362* (2013.01)

(58) Field of Classification Search
None
See application file for complete search history.

(56) References Cited

U.S. PATENT DOCUMENTS

| | | | | |
|---|---|---|---|---|
| 8,930,683 | B1 * | 1/2015 | Spertus | G06F 11/28 712/227 |
| 2008/0244332 | A1 | 10/2008 | Edwards et al. | |
| 2008/0256396 | A1 * | 10/2008 | Giannini | G06F 11/3636 714/45 |
| 2009/0320021 | A1 * | 12/2009 | Pan | G06F 11/0715 718/100 |
| 2012/0311515 | A1 * | 12/2012 | Zolotov | G06F 8/20 716/108 |
| 2013/0283101 | A1 * | 10/2013 | Yang | G06F 11/3612 714/37 |

(Continued)

OTHER PUBLICATIONS

Prvulovic, Milos; CORD: Cost-effective (and nearly overhead-free) Order-Recording and Data race detection; Proceedings of the 12th International Symposium on High-Performance Computer Architecture; Feb. 2006; 12 pages.

*Primary Examiner* — Philip Wang
*Assistant Examiner* — Rongfa P Wang
(74) *Attorney, Agent, or Firm* — Schmeiser, Olsen & Watts, LLP; William Hartwell

(57) ABSTRACT

Systems, methods and tools for identifying potential errors or inconsistencies occurring during the runtime of multi-threaded applications and reporting the errors to a user, administrator or developer for correction and adjustments to the program code or thread timings. Embodiments of the disclosure capture thread sequences during a runtime or simulation environment and store the thread sequences as a matrix or tabular representation in a file. Multi-threaded application runs having an error free thread sequence, may be used as benchmarks for identifying potential errors and mis-runs of variations to the multi-threaded application as changes occur to the application code or new threads are added to the application code. This comparison may be performed by comparing the captured thread sequences of both the passing run and the mis-run of the multi-threaded application for differences in the thread sequences that may have caused the mis-run to occur.

20 Claims, 9 Drawing Sheets

(56) References Cited

U.S. PATENT DOCUMENTS

| | | | | |
|---|---|---|---|---|
| 2015/0095710 A1* | 4/2015 | Bates | ................. | G06F 11/3636 714/38.11 |
| 2016/0103752 A1* | 4/2016 | Bates | .................... | G06F 11/362 717/124 |
| 2016/0188441 A1* | 6/2016 | Chen | ................. | G06F 11/3672 717/127 |

* cited by examiner

MULTI-THREAD SEQUENCING

TECHNICAL FIELD

The present disclosure relates generally to systems, methods and tools analyzing, debugging and benchmarking multi-threaded software programs.

BACKGROUND

Debugging multi-threaded applications can be a challenging task. The increased complexity of multithreaded programs can result in a large number of possible states that the program may be in at any given time. Determining the state of the program at the time of a failure can be difficult. Understanding why a particular state is troublesome can be even more difficult. Multithreaded programs often fail in unexpected ways, and often in a nondeterministic fashion. Failures or errors may manifest themselves inconsistently and sporadically leading to frustration by the software developers who may be accustomed to troubleshooting programming issues that are consistently reproducible and predictable. Furthermore, multithreaded programs and applications can fail in a drastic fashion. Deadlocks cause an application to hang or freeze and even the entire system to hang as well. Bugs resulting in failures and freezes are generally unacceptable to users and are expected to be fixed prior to a program's release or within a timely manner after discovering the presence of a sequencing errors in a multi-threaded program or application.

SUMMARY

A first embodiment of the present disclosure provides a method for identifying errors in a multi-threaded application comprising the steps of: running, by a processor, the multi-threaded application being tested for errors; generating, by the processor, a thread sequence of the multi-threaded application during runtime; storing, by the processor, the thread sequence being generated as a thread sequence representation file; analyzing, by the processor, the thread sequence representation file by comparing the thread sequence stored in the thread sequence representation file with a benchmark thread sequence file; identifying, by the processor, inconsistencies between the thread sequence representation file and benchmark thread sequence file as a function of the analyzing step, wherein the inconsistencies cause a mis-run thread sequence; and reporting, by the processor, the inconsistencies to a user.

A second embodiment of the present disclosure provides a computer system comprising a processor; a memory device coupled to the processor; and a computer readable storage device coupled to the processor, wherein the storage device contains program code executable by the processor via the memory device to implement a method for identifying errors in a multi-threaded application comprising the steps of: running, by the processor, the multi-threaded application being tested for errors; generating, by the processor, a thread sequence of the multi-threaded application during runtime; storing, by the processor, the thread sequence being generated as a thread sequence representation file; analyzing, by the processor, the thread sequence representation file by comparing the thread sequence stored in the thread sequence representation file with a benchmark thread sequence file; identifying, by the processor, inconsistencies between the thread sequence representation file and benchmark thread sequence file as a function of the analyzing step, wherein the inconsistencies cause a mis-run thread sequence; and reporting, by the processor, the inconsistencies to a user.

A third embodiment of the present disclosure provides a computer program product comprising: one or more computer readable hardware storage devices having computer readable program code stored therein, said program code containing instructions executable by one or more processors to implement a method for identifying errors in a multi-threaded application comprising the steps of: running, by the processor, the multi-threaded application being tested for errors; generating, by the processor, a thread sequence of the multi-threaded application during runtime; storing, by the processor, the thread sequence being generated as a thread sequence representation file; analyzing, by the processor, the thread sequence representation file by comparing the thread sequence stored in the thread sequence representation file with a benchmark thread sequence file; identifying, by the processor, inconsistencies between the thread sequence representation file and benchmark thread sequence file as a function of the analyzing step, wherein the inconsistencies cause a mis-run thread sequence; and reporting, by the processor, the inconsistencies to a user.

DETAILED DESCRIPTION

Figure 1A:
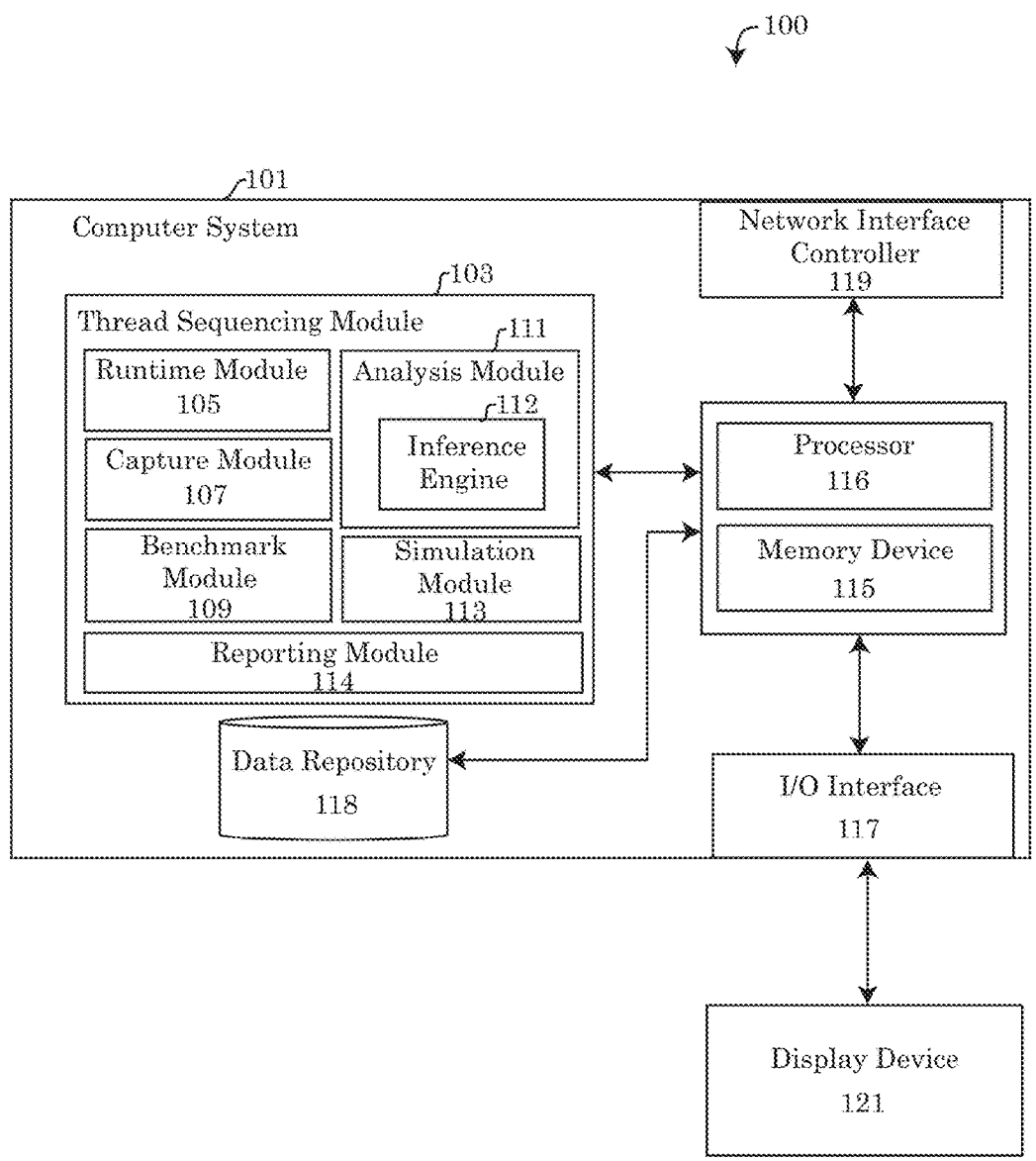
FIG. 1a depicts a block diagram of an embodiment of a system for identifying errors in a multi-threaded application.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Today, many software applications utilize multi-threading. Multi-threading allows for the simultaneous execution of two or more parts of an application in order to maximize a CPU's efficiency and reduce the overall CPU processing time during the application's runtime. Often, the threads can be designed to run parallel to one another or in a selected architecture that allows for some of the threads to run after one another in a sequence following the completion of a specific thread. However, few threads can be started at any time without affecting the output of the application. Thread sequences are often programmed to run in an overlapping fashion, yet the sequence of overlapping thread may result in errors, because many times a common object is modified by two threads. Thus the order of modification may affect the output during runtime.

Due to the threads running at different times, identifiable errors or issues may not consistently occur or may occur only a few times. Currently available debugging techniques may not consistently identify thread dependent errors. Thread dependent errors may be overly difficult to diagnose the underlying cause because the error may not be reproducible while debugging specific applications are looking for the error. This may be due in part to multiple thread being stopped during the debugging process. Moreover, the error may not be reproduced every time the application runs. In some instances, just a small change in thread sequencing can give rise to unexpected issues which may not be caught at design time or during debugging.

Embodiments of present disclosure improve upon currently available debugging methods and tools for identifying potential errors or inconsistencies occurring during the runtime of multi-threaded applications. The embodiments of the present disclosure provides a solution for thread related errors in software systems by providing systems, methods and tools to represent thread sequencing and overlap information which may allow the computer system or the user to detect the thread sequencing issues and thread related changes leading to the errors. In response to the identified error, the user or the computer system may update the application's code or adjust the thread timings to prevent the identified errors from occurring during future runs of the application.

Embodiments of the present disclosure may successfully test and analyze multi-threaded applications for errors and inconsistencies by capturing thread sequences and the overlapping of thread processes during runtime or a simulated run time. The thread sequences may be saved or stored as a thread sequence representation in a file, accessible to the system performing the testing of the multi-threaded application. The thread sequence representations may be stored in a file as a matrix or table. Each of the thread timing at the lead end of the row may be selectively compared with each of the remaining timings in the thread sequence of the row. In some embodiments, timing indicators may enclose each of the threads remaining in a particular row of the matrix or table, other than the lead thread being compared. The timing indicators may represent the timing of the thread in the row in relation to the lead thread of the row. The timing indicators may describe the position of the thread compared with the timing of the lead thread for the particular row. For example, the timing indicators may identify whether a thread starts before or after the lead thread has already commenced action and whether the thread has ended while the lead thread is still processing or after the lead thread has completed the lead thread's task.

Embodiments of the systems, methods and tools may identify both passing and failing multi-threaded application runs and identify the captured sequences being stored as either passing or failing. In some embodiments, multi-threaded application runs having an error free thread sequence, may be used for identifying potential errors and mis-runs of variations to the multi-threaded application as changes occur to the application code or new threads are added to the application code. Under conditions resulting in a failed multi-threaded application thread sequence, the system and tools may compare the thread sequences of error-free runs against the failing runs to identify potential errors. This comparison may be performed by comparing the captured thread sequences of both the passing run and the mis-run of the multi-threaded application for differences in the thread sequences that may have caused the mis-run to occur. Alternatively, in some embodiments, the system or tools may benchmark one or more multi-threaded application thread sequences as passing versions of the multi-threaded application and compare thread sequence representations of a new or updated version of the multi-threaded application against one or more benchmarks.

Once the potential causes of errors or inconsistencies between the passing thread sequences or benchmarks and the failing threads sequence has been identified, the systems and tools may report the potential causes to the user in some embodiments. The user may use the reported causes of errors to debug the application code, make adjustments to the thread timings or optimize the code in order to maintain the thread timings in the multi-threaded application in a manner consistent with the passing thread sequences or the benchmarked thread sequences. Once the multi-threaded application has been amended, the user may re-select the application for testing to ensure that the thread sequencing does not raise errors.

System for Identifying Errors in a Multi-Threaded Application

Figure 1B:
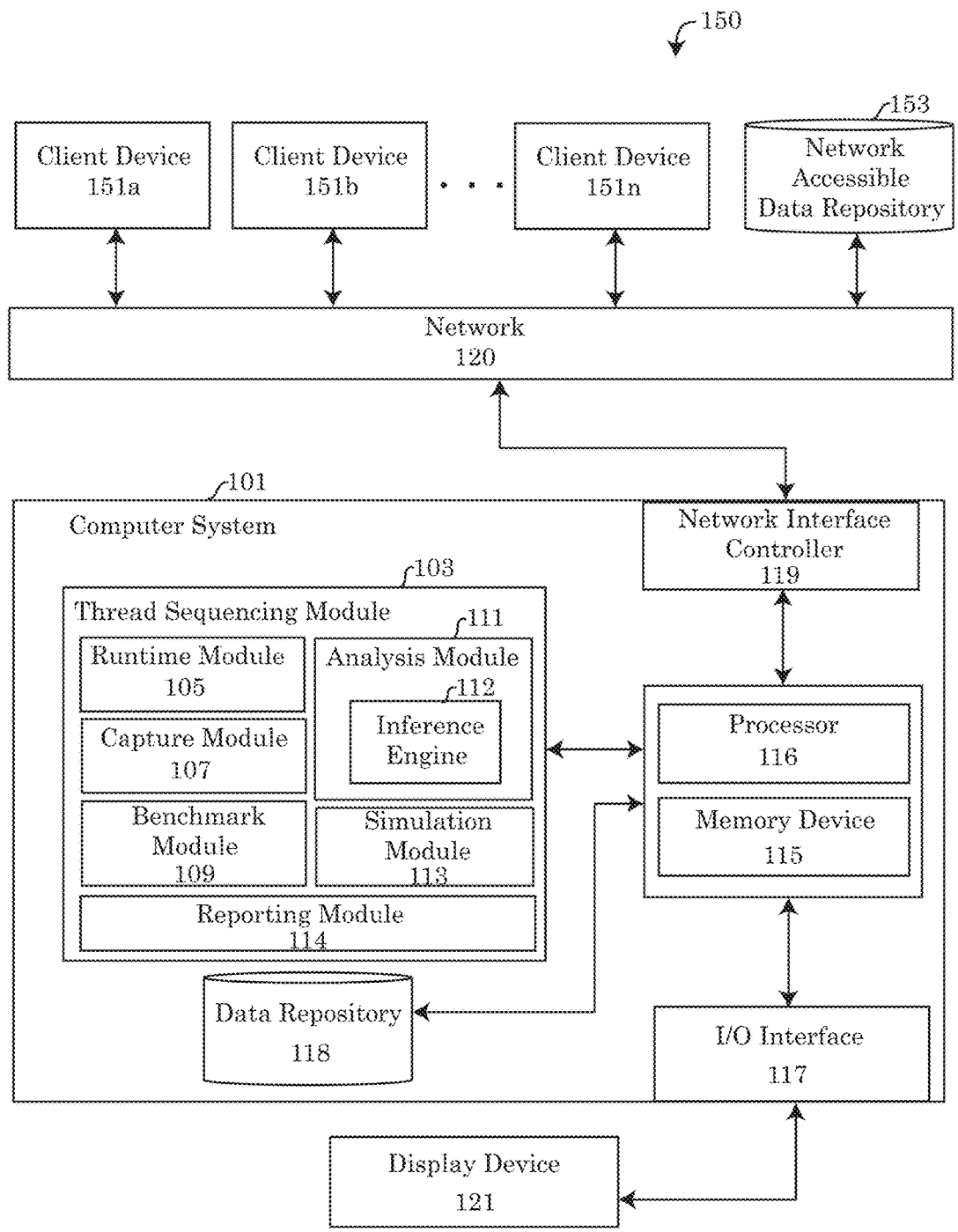
FIG. 1b depicts a block diagram of an alternative embodiment of a system for identifying errors in a multi-threaded application.

Referring to the drawings, FIGS. 1*a* to 1*b* illustrate a diagram of embodiment of a system 100, 150 for identifying errors in a multi-threaded application, consistent with the disclosures of this application. Embodiments of systems 100, 150 may comprise a specialized computer system 101 having a specialized configuration of hardware, software or a combination thereof as depicted in FIGS. 1*a*-1*b* and as described throughout the present disclosure. Embodiments of the computer system 101 may further comprise one or more elements of the generic computer system 500 of FIG. 5, described in detail below. The elements of the generic computer system 500 may be integrated into each of the specialized computer systems 101 described herein.

Embodiments of the computer system 101 may be a specialized computer system which may include a processor 116, specialized hardware or circuitry and/or software loaded in the memory device 115 of the computer system 101. The embodiments of the computer system 101 may perform functions, tasks and routines relating to runtime or simulated executions of multi-thread applications, capturing thread sequences and thread overlapping information during the execution of the multi-thread applications, establishing benchmarks for the multi-thread applications being run, writing the captured thread sequences to a thread sequence representation file, comparing the captured thread sequences stored in the thread sequence representation file to the benchmarked thread sequences to identify errors or inconsistencies in the multi-thread applications and reporting the potential errors and inconsistencies discovered by the system to a user, administrator or developer.

Embodiments of the specialized hardware and/or software integrated into the computer system 101 may be part of a thread sequencing module 103 performing each of the functions of the computer system 101 relating to the running, capturing, benchmarking and analysis of the thread sequences of the multi-threaded applications. The hardware and/or software components of the thread sequencing module may include sub modules performing each task of the computer system 101. These sub modules may include a runtime module 105, a capture module 107, benchmark module 109, analysis module 111 which may comprise an inference engine 112, simulation module 113 and a reporting module 114. As used herein, the term "module" may refer to a hardware module, software-based module or a module may be a combination of hardware and software resources of the computer system 101 and/or resources remotely accessible to the computer system 101 via a computer network 120.

Embodiments of computer system 101, may, in some embodiments be connected and placed in communication with one or more additional computer system over a computer network 120, including one or more client devices 151a, 151b . . . 151n (collectively referred to as client devices 151). Embodiments of the network 120 may be constructed using wired or wireless connections between each hardware component connected to the network 120. As shown in the exemplary embodiment 150 of FIG. 1b, each of the computer systems 101, 151 may connect to the network 120 and communicate over the network 120 using a network interface controller (NIC) 119 or other network communication device. Embodiments of the NIC 119 may implement specialized electronic circuitry allowing for communication using a specific physical layer and a data link layer standard, such as Ethernet, Fiber channel, Wi-Fi or Token Ring. The NIC 119 may further allow for a full network protocol stack, enabling communication over network 120 to the group of computer systems or other computing hardware devices linked together through communication channels. The network 120 may facilitate communication and resource sharing among the computer systems 101, 151 and additional hardware devices connected to the network 120, for example a network accessible data repository 153 or other network accessible storage devices connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Embodiments of the modules described in this application, whether comprising hardware, software or a combination of resources thereof, may be designed to implement or execute one or more particular functions, tasks or routines of the computer system 101 described herein. Embodiments of hardware-based modules may include self-contained components such as chipsets, specialized circuitry and one or more memory devices comprising a memory storage medium (described below). A software-based module may be part of a program code or linked to program code or computer code 597, 598 containing specific programmed instructions loaded into the memory device 115 of the computer system 101, and/or a remotely accessible memory device 115 of a network accessible computer system. For example, in some embodiments the network accessible computer system connected to computer system 101 may be a web server, application server, client device 151 or network accessible hardware, accessing the thread sequencing and debugging capabilities of computer system 101 remotely over the network 120.

Embodiments of the runtime module 105 may perform the task or function of keeping track of the runtime environment and data structure while each program being tested by the computer system 101 is running or executed. In some embodiments, the runtime module 105 may provide the environmental variable and operating-system provided services allowing for the tested program to interact with the rest of the computer system 101. In an embodiment of the system 100 wherein the computer system 101 is testing a multi-thread application programmed in an object oriented language, the runtime module 105 may establish or provide a table of objects, classes and methods that may be built to allow for messaging between elements of the application being tested to occur while running. For example, the runtime may include any libraries, frameworks or other files referenced by the multi-thread application while running. In some embodiments, when a multi-threaded application is selected to be placed into runtime, the application may be loaded into the memory device 115. Likewise, when testing of the application concludes and the runtime period ends, the memory used within the memory device 115 by the multi-thread application may be made available for other applications.

Embodiments of the multi-threaded applications being tested may be placed into the runtime environment, which may be controlled by the runtime module 105, while testing or benchmarking the multi-thread application. In some embodiments, the runtime environment of the multi-thread application may vary depending on the mode of testing selected by the computer system 101. For example, during a benchmark of a multi-thread application, a user, administrator or developer may select a benchmark mode as a runtime environment, allowing for the tested application to be stored as a benchmark thread sequence file, which may be used for comparing multi-thread applications tested in the future.

Embodiments of the computer system 100, may further comprise a capture module 107. The capture module 107 may perform the task or function of collecting thread sequence data during the execution of a multi-thread application in the runtime environment. The capture module 107 may convert the collected thread sequence data and format the thread sequence data into a thread sequence representation file 210, 310. The thread sequence representation file 210, 310 may describe the characteristics of each thread running during the execution of the multi-thread application and the relationship of the timings of between each thread.

Figure 2A:
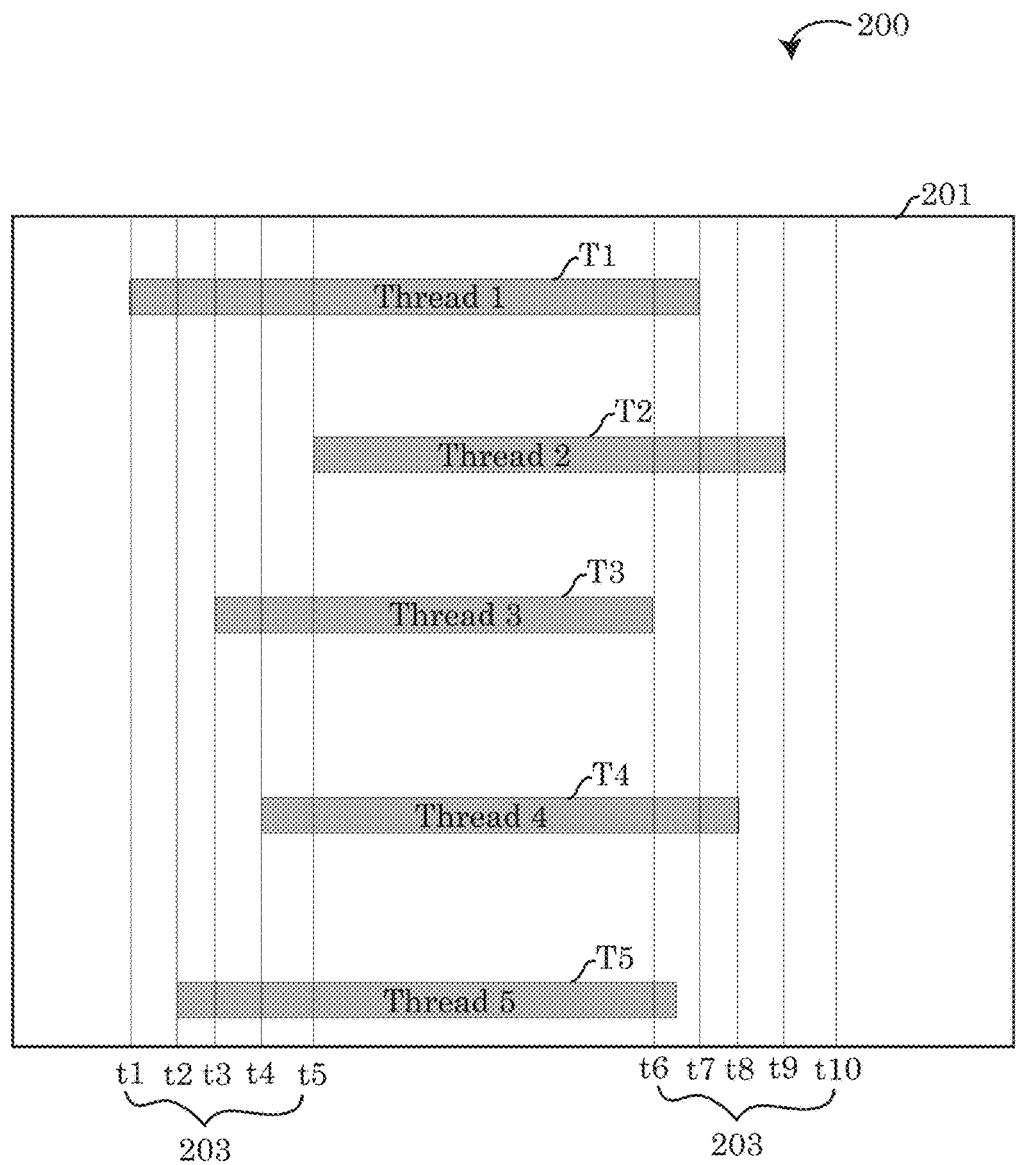
FIG. 2a illustrates a diagram of an embodiment of a benchmarked thread sequence.

Referring to the drawings, FIG. 2a depicts a visual representation of a thread sequence 201 being executed during the runtime of a multi-thread application. In this particular embodiment of the thread sequence 201, there are five threads T1 to T5 executing a function or task of the multi-thread application. However, a multi-thread application may comprise any number of a plurality of threads. For instance, the multi-thread application may comprise at least two threads in some embodiments, whereas in alternative embodiments, a multi-thread application may run that has thousands of threads. For example, under a Windows® operating environment, a 32 bit operating system may have 2-2000 threads, whereas under a 64 bit operating system, the number of threads may be 2-10,000 threads or more, because a maximum thread count has not been precisely identified.

As shown by the visual representation, each of the thread's runtime is positioned along a time line 203. The timeline 203 intervals in the specific example of the thread sequence 201 ranges from t1 to t10, however the number of intervals, the timing of the intervals and spacing between the intervals could be configured in any manner and in some embodiments may be dependent upon the thread sequence being tested. As shown in the example of FIG. 2a, each of the threads T1 to T5 are plotted along the timeline. The visual representation of the thread sequence 201 demonstrates starting position, ending position and the duration of each thread T1 to T5 relative to each other thread in the thread sequence 201 executed during runtime of the multi-thread application.

The capture module 107 may collect and organize thread sequence 201, 301 data and convert the data of the thread sequence 201, 301 into a file format that takes into account the relationships between each threads' start time, end time and duration, compared with each of the other threads within the thread sequence 201, 301. In the example depicted in FIG. 2b, the thread sequence representation file 210 identifies each of the properties of thread sequence 201 converted into a formatted table or matrix. The table or matrix comprising the thread sequence data may be organized into rows and columns. At the beginning of each row of the thread sequence representation file 210, 310, the row may include a lead thread 211. The lead thread 211 may be thread of the thread sequence 201, 301 being compared to each of the remaining threads in the row. For example, in first row of the thread sequence representation file 210, the lead thread is T1. Likewise, in the second row, the lead thread 211 is thread T2, while in the third row the lead thread 211 is T3.

Each additional thread beyond the lead thread 211 in row of the table or matrix may be referred to as a comparative thread 213. For example, in the first row of the thread sequence file 210, T1 is the lead thread being compared with each of the remaining comparative threads 213 T2, T3, T4 and T5 respectively. Likewise, in row two of the table or matrix, the lead thread 211 is T2 and the comparative threads are T3, T4, T5 and T1 respectively. Embodiments of each comparative thread in the thread sequence file 210, 310 a relationship indicator 215, 217 bracketing each the comparative thread 213 in each row of the table or matrix. Each relationship indicator 215, 217 may describe the relationships between the timings of the lead thread 211 and the comparative thread 213. The first relationship indicator 217 positioned in front of the comparative thread 213 may describe the relationship the timing between the lead thread 211 and the comparative thread 213 at the time the comparative thread 213 initiates. Likewise, the second relationship indicator 215 enclosing the opposite end of the comparative thread 213 may indicate the relationship between the timings of the lead thread 211 and the comparative thread 213 at the conclusion of the processing performed by the comparative thread 213.

Figure 2B:
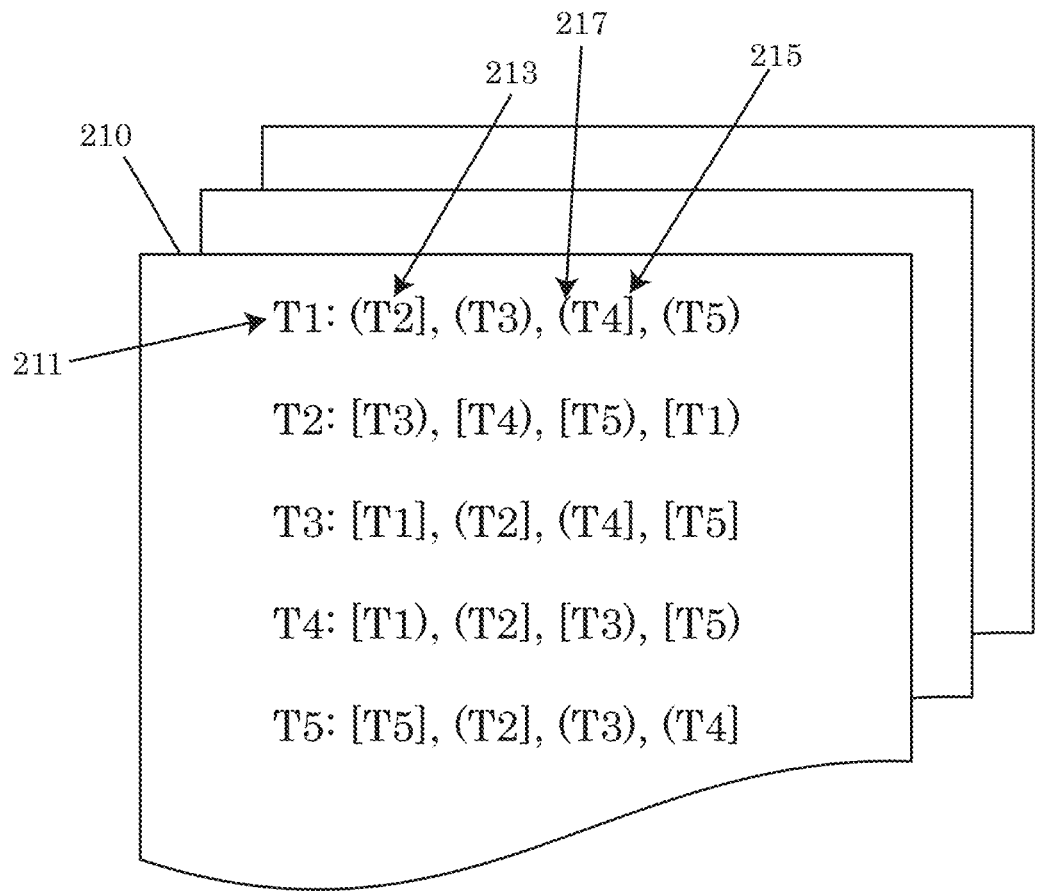
FIG. 2b depicts an embodiment of a representation of the benchmarked thread sequence of FIG. 2a collected by a system for identifying errors in a multi-threaded application.

Using the first row of the thread sequence file 210 of FIG. 2b as an example, the lead thread 211, T1, is compared with T2, T3, T4 and T5. In this particular embodiment, the relationship indicators 215, 217 may be represented as either a parenthesis "( )" or a bracket "[ ]". In this embodiment, the parenthesis occurring as the first relationship indicator 217 may indicate that the lead thread 211 commenced operation prior to the initiation of the comparative thread 213. Conversely, a bracket occurring as the first relationship indicator 217 may indicate that the lead thread 211 commenced while the comparative thread 213 was already performing one or more operation or function. Likewise, the presence of a parenthesis or bracket as the second relationship indicator 215 may additionally provide relational information about the timing of the lead thread 211 at the time the comparative thread 213 ceases operation. A parenthesis occurring at the second relationship indicator 215 may indicate that at the time the lead thread 211 ceases operation, the comparative thread 213 has already finished processing. Conversely, a bracket at the second relationship indicator 215 may indicate that at the cessation of thread operations by the lead thread 211, the comparative thread 213 may continue to process instructions of the application.

Using the first and second row of the thread sequence file 210 as an example, in the first row, comparing the lead thread 211 T1 to the second thread, T2, written as (T2], the relational timings of threads T1 and T2 may be made clear to a user, administrator or developer viewing the thread sequence file 210. First, the parenthesis in (T2] presented as the first relationship indicator 217 indicates that the lead thread 211 in the first row, T1, being described, was already processing operations within the thread sequence 201 at the commencement of T2's operations at timing t5. Secondly, the entry in the first row of the thread sequence file 210 further indicates that at the completion of T1's operation at timing t7, thread T2 continued operations. This relationship is mirrored in row two of thread sequence file 210 from the perspective of T2 as the lead thread 211. In row two, T1 is denoted as [T1). The first relationship indicator 217 expressed as a bracket indicates that at the commencement of the lead thread 211, T2, was not yet commencing operations in the thread sequence 201 at the time T1 commences operations at time t1. This is further reinforced in FIG. 2a which clearly shows thread T2 did not commence until timing t5. Likewise, the parenthesis indicated as the second relational indicator 215 of [T1) further indicates that at the time T2 ceased operation, T1 was no longer active, which is clearly reflected in FIG. 2a, whereby at the cessation of T2 at timing t9, thread T1 had already ceased operation at timing t7.

In some embodiments of system 100, 150 the capture module 107 of computer system 101 may provide additional information in the thread sequence file 210. For example, in some embodiments, the capture module 107 may include references to the timings at the start and conclusion of each comparative thread 213. Using the first row of the thread sequence file 210, the first row writing to include the timings may be presented as T1: t5(T2]t9, t3(T3)t6, t4(T4]t8, t2(T5) t6.5.

The thread sequencing module 103 may comprise in some embodiments of system 100, 150 a benchmark module 109. The benchmark module 109 may perform the functions or tasks of benchmarking multi-thread applications and storing the benchmarking results. The benchmarking module 109 may assess one or more multi-thread applications by capturing the thread sequence 201, 301 and storing the thread sequence 201, 301 as a benchmarked thread sequence file 210, 310 after confirming the thread sequence 201, 301 has performed the programmed operations of the multi-thread application without experiencing an error or mis-run. Embodiments of the benchmarked thread sequence files 201, 301 may be saved or stored to the benchmark module's 109 onboard memory, memory device 115, local repository 118 or a network accessible repository 153. The benchmark module 109 may load the benchmarked thread sequence files 201, 301 as requested by the runtime module 105 or simulation module 113 (discussed below) for comparison in future testing runs between the benchmarked thread sequences and thread sequences captured and stored by the capture module 107.

The benchmark module 109 may create new benchmark thread sequences in some embodiments, once the runtime module 105 has been placed into a benchmark mode, and a multi-thread application has been selected for benchmarking purposes. Embodiments of the benchmark module 109 may be accessed and used to load one or more benchmark thread sequence files 210, 310 while testing a multi-thread application. For example, while testing a failed thread sequence, the computer system 101 may load one or more benchmark thread sequence files and compare the recently failed thread sequence file to a benchmark thread sequence file. Inconsistencies between the benchmark and the failed sequence file may be noted by the computer system 101 or brought to the attention of a computer system 101 user, administrator or developer, in order to amend or optimize the multi-threaded application's code and parity the thread sequence of the benchmarked thread sequence file.

In some embodiments, the thread sequencing module 103 may include an analysis module 111. Embodiments of the analysis module 111 may perform the act of comparing benchmarked thread sequences or previously stored passing thread sequence files with a failed thread sequence file. Using a benchmarked or passing thread sequence file 201, the analysis module 111 may identify inconsistencies between passing/benchmarked thread sequences and the failing thread sequences. In particular, the analysis module 111 may identify changes in the timing relationships and processing times of thread sequences compared with passing or benchmarked thread sequence files. Changes in the relationship between the lead thread 211 and the comparative thread 213 may be indicative of a mis-run. For example, relationship indicators 215, 217 between the lead thread 211 and comparative thread 213, between the passing thread sequence/benchmark thread sequence file 201 and a failing thread sequence file 301 may be indicative of a mis-run that might be amended in the code of the multi-thread application.

In some embodiments, the analysis module 111 may draw one or more inferences describing a potential cause of a mis-run, indicating to a user, administrator or developer, the cause of the potential failure or error exhibited by the failed thread sequence. Embodiments of the analysis module 111 may include an inference engine 112, which may provide the logical conclusions about the cause of the mis-run thread sequences 310 as a function of the analysis module 111 comparison between the passable/benchmark thread sequence file 210 and the failed thread sequence file 310. The inference engine 112 may contain a knowledge base of facts and rules which may allow for the inference engine 112 to apply logic to the analysis performed by the analysis engine 111 and ultimately provide conclusions based on the knowledge, rules and facts.

Figure 3A:
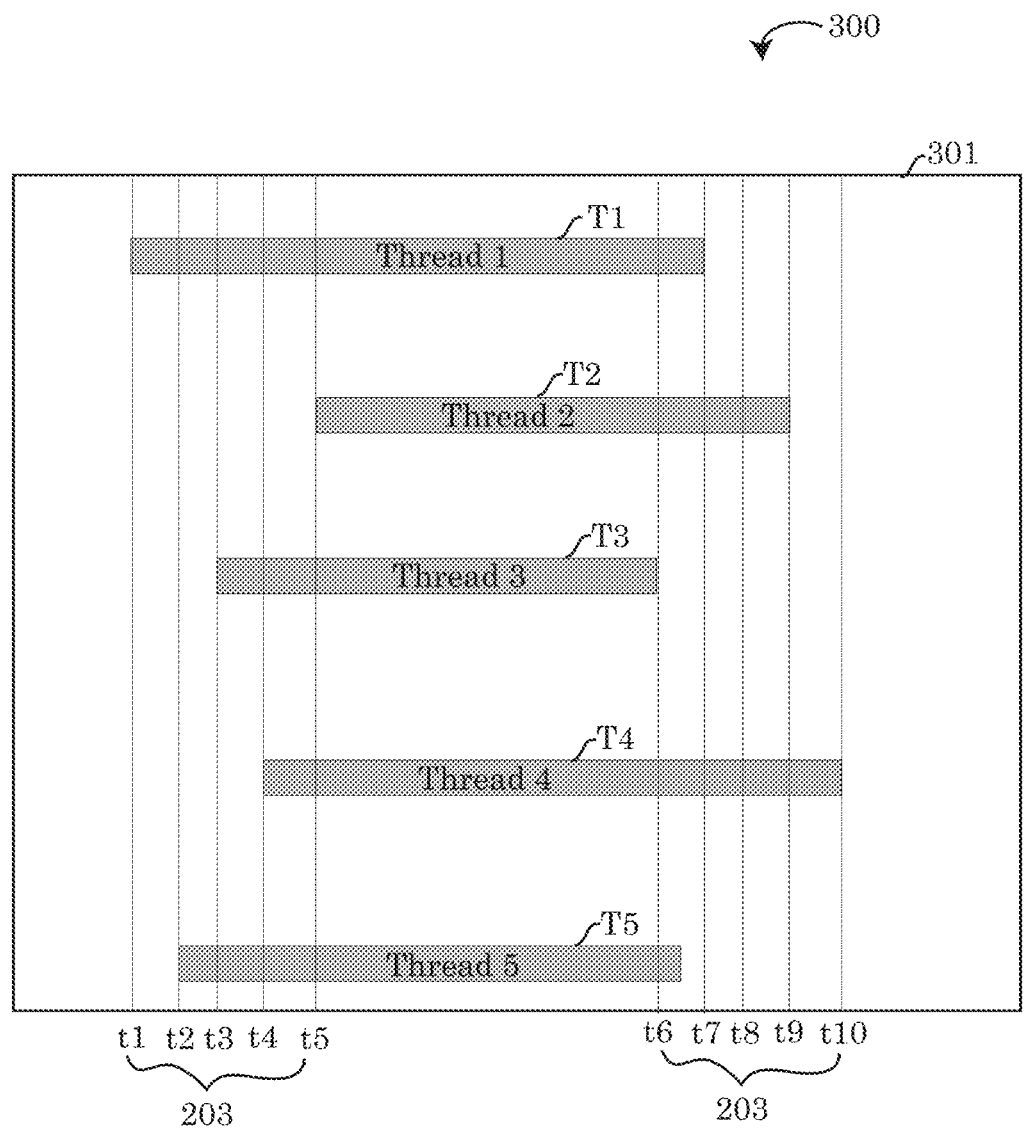
FIG. 3a illustrates a diagram of an embodiment of a mis-run thread sequence.
Figure 3B:
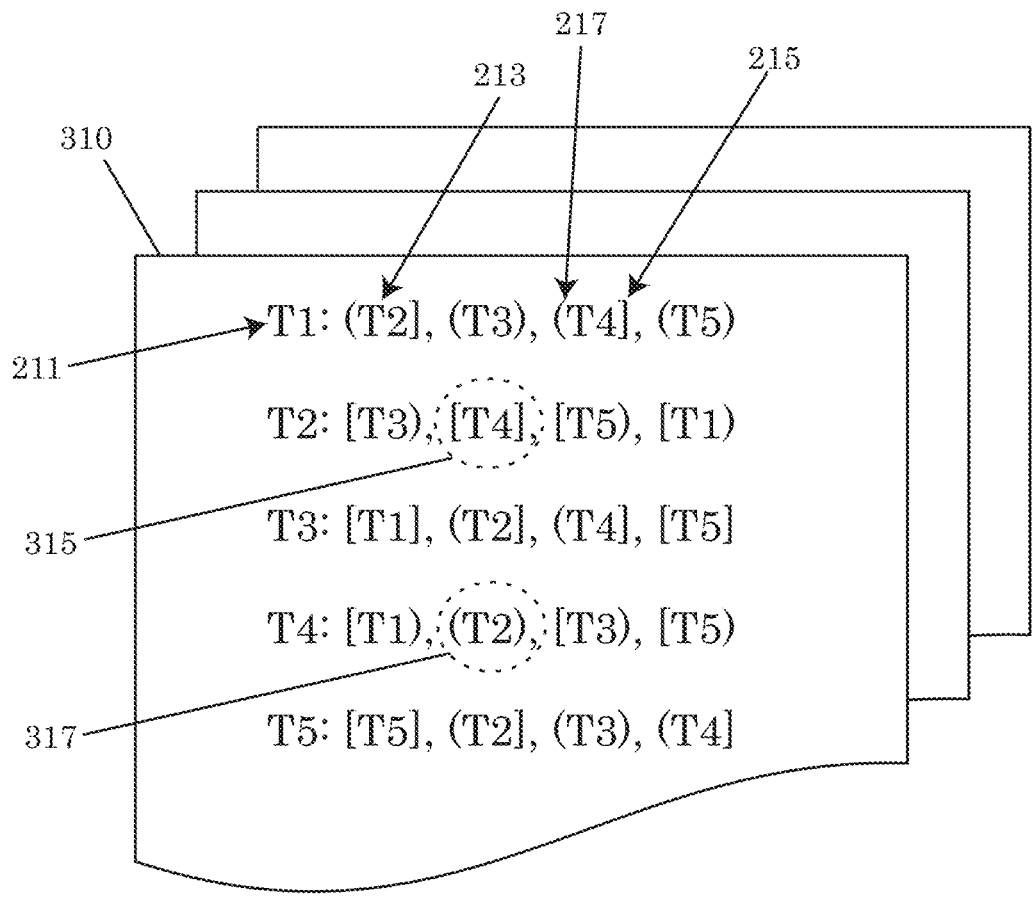
FIG. 3b depicts an embodiment of a representation of a mis-run thread sequence of FIG. 3a collected and stored as a file by a system for identifying errors in a multi-threaded application.

FIG. 3b provides an example of a failed thread sequence stored in a thread sequence file 310. Embodiments of the analysis module 111 which may comprise an inference engine 112 may seek to identify the reasons for the mis-run of the thread sequence captured as thread sequence file 310. One way to identify the cause of the mis-run may be to compare the failed thread sequence to a passing or benchmarked thread sequence file 210. Upon comparison and analysis by the analysis module 111. The analysis module 111 may be note that the timing and relationship between thread T2 and thread T4 have changed between the benchmarked thread sequence file 210 and the failed thread sequence file 310. These relationship changes 315, 317 may be further analyzed by the inference engine 112 to determine the how the relationship changes 315, 317 may have resulted in a mis-run. For example, from the perspective of thread T2 as the lead thread 211, it may be concluded that the increase or delay in the overall processing time of thread T4 beyond thread T2 may have resulted in a mis-run. Likewise, from the perspective of thread T4 as the lead thread, the inference engine 112 may conclude that thread T2 may have improperly finished ahead of thread T4, in turn causing the potential mis-run.

In some embodiments of the thread sequencing module 103, the computer system 101 may further comprise a simulation module 113. The simulation module 113 may work alongside the analysis module 111 and inference engine 112 to perform the task or function of modeling the conclusions drawn by the analysis module 111 and inference engine 112. The simulation module 113 may run simulations of the failing thread sequences, adjusting for the causes of the mis-runs as identified by the analysis module 112 and/or inference engine 112. The simulation module 113 may run the thread sequence under the failed conditions causing the mis-run and adjust the conditions based on the conclusions of the inference engine 112 to correct for the proposed cause of the mis-run.

Embodiments of the simulation module 113 may report the results of the simulated thread sequencing runs to the analysis module 111 or inference engine 112. Based on the success of failure of the simulation module's 113 model thread sequence, the inference engine 112, or analysis module 111 may draw more accurate conclusions regarding the cause of the mis-run. Using the example described above wherein the inference engine 112 proposed that the mis-run may have been caused by thread T2 improperly finishing ahead of thread T4. The simulation module 113 may run a model thread sequence wherein T2 finishes after thread T4 and as a result of the changes in timing of the T2 and T4 threads, the simulation module may simulate the results. If according to the results of the simulation, the thread sequence is predicted to be successful, the simulation module 113 may report the success to the inference engine 112. Based on the success in the simulation of the inference engine's prediction of the cause of the mis-run, the inference engine may have an increased confidence level that the proposed cause of the mis-run is correct.

Embodiments of the thread sequencing module 103 may further comprise a reporting module 114. The reporting module 114 may be responsible for reporting and displaying output from the computer system 101 in a readable format that a user may understand. The reporting module may display the thread sequence files 210, 310 on one or more display devices 121 or transmit the thread sequence files to one or more client devices 151. In some embodiments, the reporting module 114 may construct a report describing the conclusions of the analysis module 111 and inference engine 112. The report may include details of simulations performed by the simulation module 113, the parameters of the simulations and the results of the simulation. Moreover, in some embodiments, the report generated by the reporting module 114 may alert or notify a user, administrator or software developer having access to computer system 101, or a client device 151 placed in network communication with computer system 101. The generated report may provide useful information to a user, administrator or developer for amending or optimizing the multi-threaded application code in order to avoid the identified mis-runs in some embodiments. In alternative embodiments, the computer system 101 may amend the code based on the suggestions of the analysis module 111 or inference engine 112 and report back to the user, administrator or developer of the changes in the code and/or success of the thread sequence once the amended or optimized code has been run.

Method for Identifying Errors in a Multi-Threaded Application

Figure 4A:
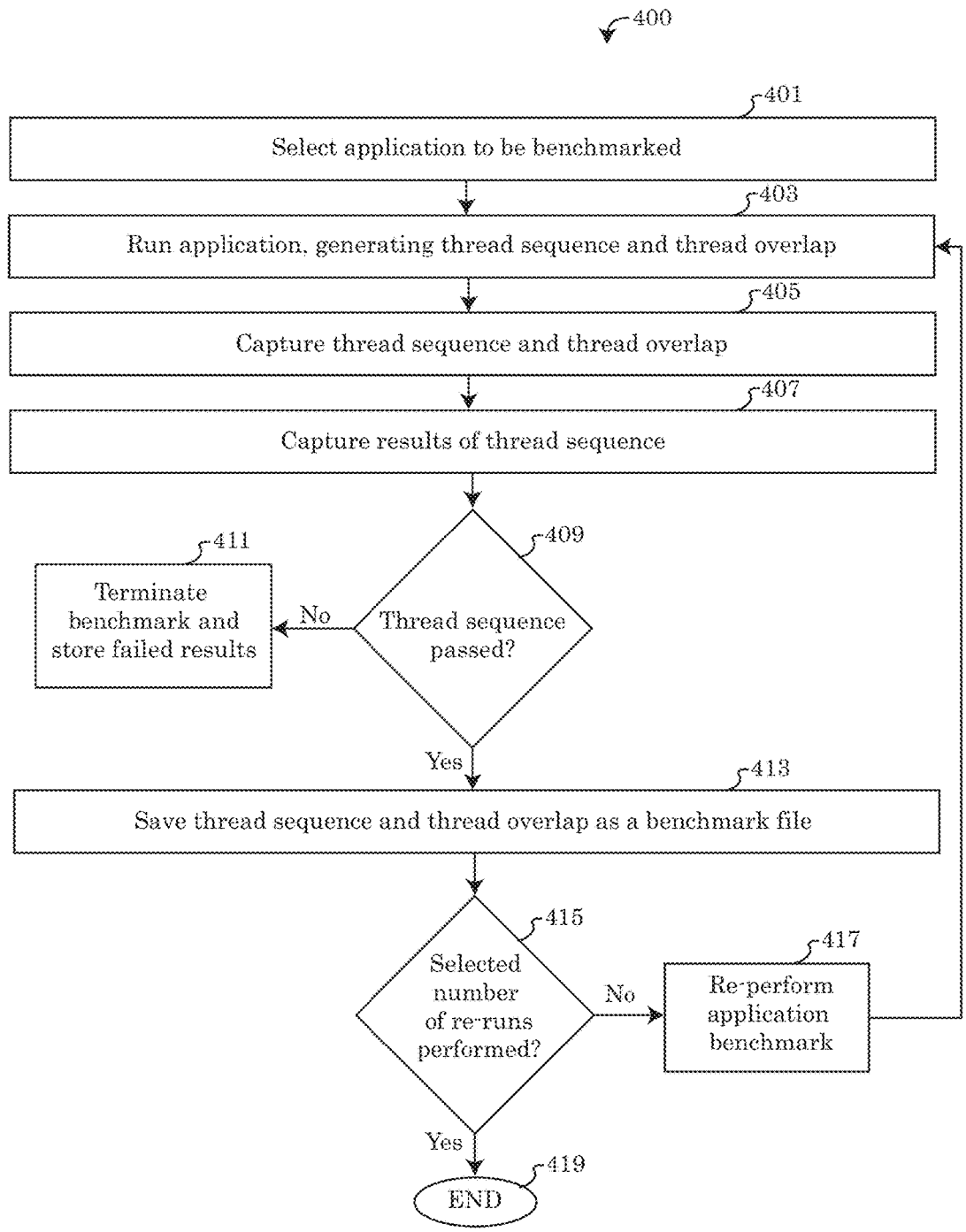
FIG. 4a depicts an embodiment of an algorithm for benchmarking a multi-threaded application.
Figure 4B:
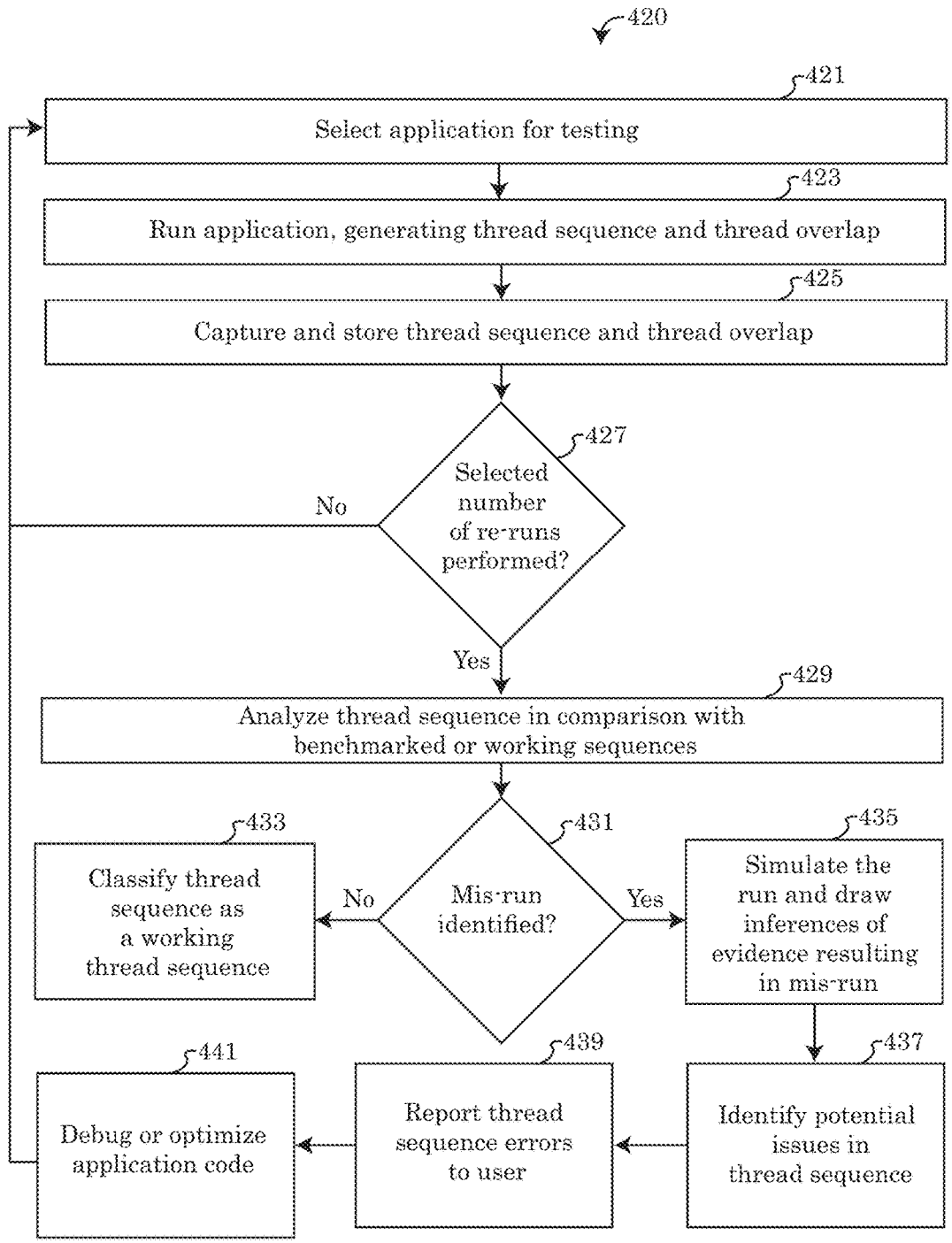
FIG. 4b depicts an embodiment of an algorithm for identifying errors in a multi-threaded application.

The drawing of FIGS. 4a-4b represents an embodiment 400, 420 of algorithms that may be implemented for identifying errors in a multi-threaded application, in accordance with the systems described in FIGS. 1-3b using one or more computer systems defined generically in FIG. 5 below, and more specifically by the specific embodiments depicted in FIGS. 1-3b. A person skilled in the art should recognize that the steps of the method described in FIGS. 4a-4b may not require all of the steps disclosed herein to be performed, nor does the algorithm of FIGS. 4a-4b necessarily require that all the steps be performed in the particular order presented. Variations of the method steps presented in FIGS. 4a-4b may be performed in a different order than presented by FIGS. 4a-4b.

The algorithm 400 described in FIG. 4a may describe an embodiment for benchmarking a thread sequence and storing the thread sequence as a benchmark thread sequence file. The algorithm 400 may initiate in step 401 by selecting a multi-threaded application to be benchmarked by the computer system 101. The multi-threaded application may be loaded into the memory device 115 of the computer system 101 or loaded into a memory device of a network accessible computer system such as a network accessible client device 151, whereby the benchmarking may occur remotely.

In step 403, of the benchmarking algorithm 400, the computer system 403 may run the multi-thread application in benchmark mode using the benchmark module 109, or the computer system 101 may run the application in a normal runtime environment using the runtime module 105. As the application is run by the computer system 101, the multi-thread application may generate a thread sequence which may comprise thread overlaps from multiple threads processing the instructions of the application in a parallel fashion.

In step 405 of the algorithm 400, the capture module 107 of the thread sequencing module 103 may capture and save the thread sequence of the application and store the thread sequences in the memory device 115 of the computer system 101, a data repository 118, network accessible data repository 158 or memory storage device of a remotely accessible computer system such as client devices 151. In step 407, the capture module 107 may further capture the results of the thread sequence and whether or not the thread sequences captured by the thread sequence module 107 resulted in a successful or passing thread sequence or whether or not the thread sequence has failed. In step 409, a determination is made by the thread capture module 107 whether or not the thread sequences passed or failed. If, in step 409 the thread sequence has been determined to be a failed thread sequence during a benchmark test, the algorithm 400 may proceed to step 411 wherein, the benchmark module 107 may terminate the benchmark test and store the failed thread sequence results as a thread sequence file 210, 310.

If, on the other hand, the thread sequence module 103 determines that the benchmarked thread sequence has passed, the algorithm 400 may proceed to step 413, wherein the benchmark module may save the thread sequence captured by the capture module 107 as a benchmark thread sequence file. The thread sequences stored locally by the computer system or remotely by the network accessible repositories and/or client devices 151 may be written and formatted into a thread sequence file 210, 310 that may be used for benchmarking. The benchmark thread sequence file may be stored by the computer system or remotely and used during future application runs to compare variations of the multi thread applications to the successful benchmark's thread sequence embodied in the benchmark thread sequence file.

In some embodiments of the algorithm 400, a benchmark application may be run a plurality of times to ensure consistent and accurate thread sequence information. The algorithm 400 may perform in step 415 a determination regarding whether or not the benchmarking module 109 has met a pre-determined or pre-programmed number of benchmarking runs of the multi-thread application. If, in step 415, the benchmark module 109 has performed a requisite number of benchmarking runs on the thread sequences of the multi-thread application, the algorithm may conclude benchmarking by ending at step 419. Conversely, if in step 415, the benchmarking module 109 has not completed a requisite number of benchmarking runs on the multi-thread application, the algorithm may proceed to step 417 and pre-perform the application benchmark run. The thread sequencing module 103 may run the multi-thread application over again beginning in step 403 and generate a new thread sequence/thread overlap to benchmark.

In some embodiments, the computer system 101 may perform testing on one or more multi-thread applications in order to identify errors that may arise during the runtime of the multi-threaded application. The algorithm 420 for identifying potential errors in the multi-threaded application may begin at step 421. In step 421 of the algorithm 420, the computer system 101 may select the multi-threaded application to test. In step 423 of the algorithm, the computer system 101 and more specifically the thread sequencing module 103 may run the application selected in step 421 and as a function of running the application, the multi-thread application may generate a thread sequence. Embodiments of the multi-thread application may be loaded into the memory device 115 of the computer system 101, a computer readable storage device such as repository 118, a network accessible storage device such as network repository 153 or a memory device of a network accessible client device 151. The application selected in step 421 may run in a runtime environment provided by the runtime module 105.

In step 425 of the algorithm 420, the capture module 107 may store the thread sequence generated by the multi-thread application during the runtime. The capture module 107 may store the captured thread sequence data as a thread sequence file 210, 310 and format the thread sequence data in the thread sequence file into a readable file describing the relationships and timing between each of the threads, as shown in FIGS. 2b and 3b. In some embodiments of the algorithm 420, the thread sequence module 103 may run the multi-thread application a plurality of times in order to ensure that the thread sequence data collected by the capture module 107 and stored as a thread sequence file is consistent between each of the runs. In step 427, the thread sequence module may determine whether or not the pre-determined or pre-programmed number of application runs have been performed by the computer system. If, the requisite number of application runs have not been performed, the algorithm 420 may return to step 421 and re-run the multi-thread application in order to re-generate and capture the thread sequence.

Alternatively, in step 427, it may be determined by the computer system 101 that the selected number of application runs have been performed. Under such conditions where the selected plurality of application runs have been performed, the algorithm 420 may proceed to step 429, wherein the analysis module 111 may analyze the thread sequence file and compare the thread sequence file to a corresponding benchmark thread sequence file generated using algorithm 400. Alternatively, instead of utilizing a benchmarked thread sequence, in some embodiments, the analysis module 111 may compare the differences between the captured thread sequence stored by the capture module 107 in step 425 with a captured thread sequence that has been previously determined to be considered to be operating correctly.

In step 431 of the algorithm 420, the analysis module 111 may detect whether or not the differences between the thread sequence file of the current application test differ from the benchmark file or previously passing thread sequence could have led to a misrun of the thread sequence currently being tested by the computer system 101. If, in step 431, a misrun has not occurred, the algorithm 420 may move to step 433 and classify the thread sequence of the current application to be considered a working (or passing) thread sequence. Conversely, if in step 431, the application being tested has resulted in a misrun, the computer system 101 and the thread sequencing module 103 may attempt to identify the cause of the misrun.

In step 435 of the algorithm 420, the analysis module 111, inference engine 112 and the simulation module 113 may attempt to draw inferences and conclusions about the current application run in order to identify the underlying cause of the misrun. In step 435, the inference module may, as a function of the comparison of the thread sequence file of the current application run and the benchmark thread sequence file, infer a reason for the misrun's occurrence. In some embodiments, the inference engine's 112 proposed underlying cause may be tested by simulating an application run using the simulation module 113. As a result of the simulation performed by the simulation module 113, the inferences posed by the inference engine 112 may be confirmed or discredited. A discredited inference may allow for the inference engine 112 to suggest a secondary underlying cause of the misrun. In some embodiments, the inference engine 112 may continuously simulate potential inferred causes of the misrun until a confirmation of the underlying cause is confirmed in a simulation.

Once a simulation has confirmed the underlying cause of the misrun of the thread sequence, the analysis module 111 may, in step 437 identify the thread sequence error in the thread sequence file 210, 310. In some embodiments, the analysis module 111 may highlight or tag the underlying cause of the misrun, allowing for a user, administrator or developer to more easily spot the underlying cause. In other embodiments, the computer system 101 may attempt to amend the application code as a function of the inferences drawn by the thread sequencing module 103. After identifying the potential issues in the thread sequence in step 437, in step 439, the reporting module 114 of the computer system may report the thread sequencing errors in one or more generated reports to a user, administrator or developer. The generated report may be displayed on a display device 121 of the computer system or transmitted over the network 120 to a network accessible computer systems such as client devices 151. In response the generated report transmitted to the user, administrator or developer by the computer system 101, alerting the appropriate parties of the misrun, in step 441, the user, administrator or developer may debug or optimize the application's code and further select the amended application for further testing.

Computer System

Figure 5:
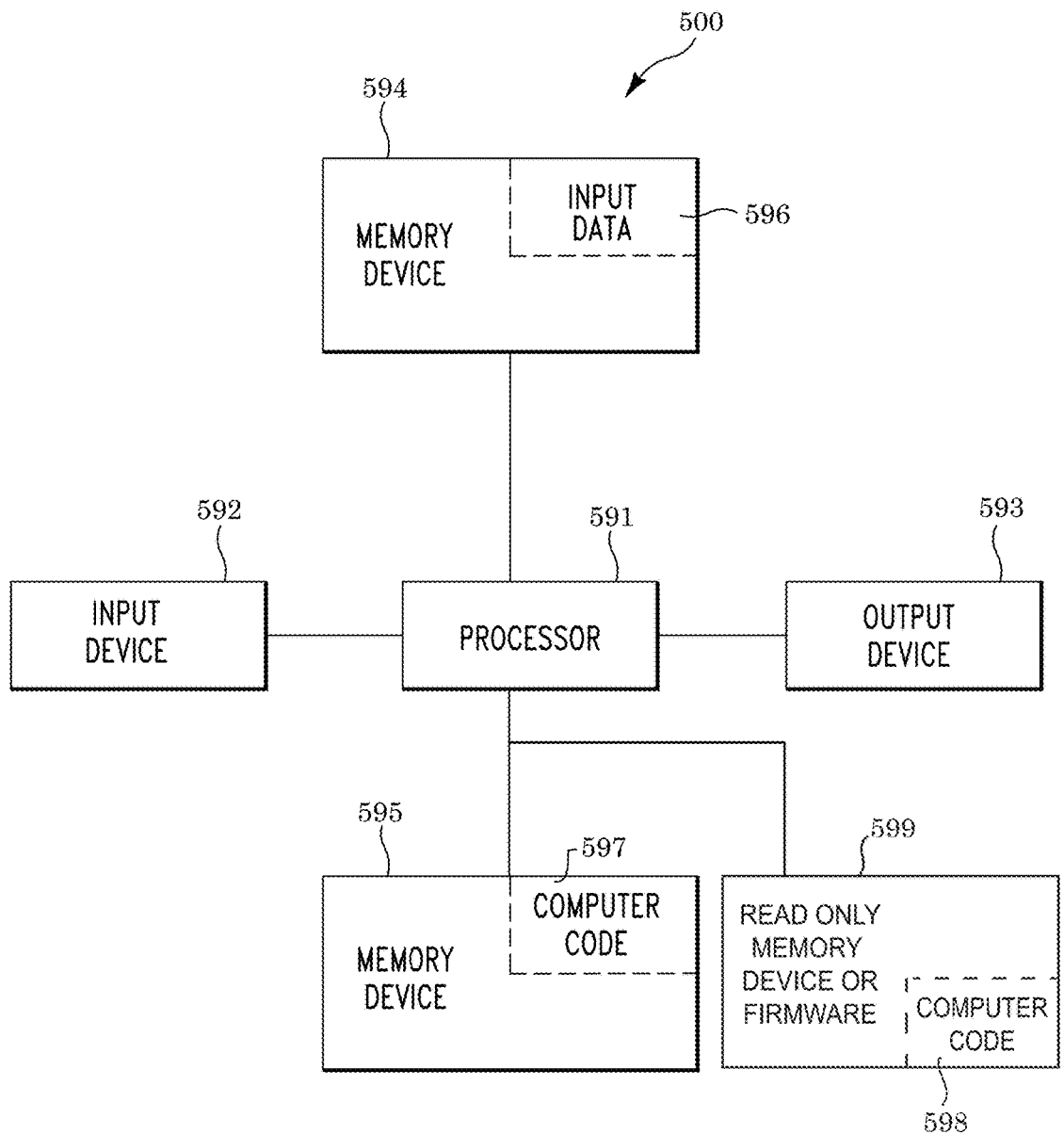
FIG. 5 depicts a block diagram of a computer system able to implement the methods for identifying errors in a multi-threaded application, consistent with the disclosure of the present application.

Referring to the drawings, FIG. 5 illustrates a block diagram of a computer system 500 that may be included in the systems of FIGS. 1-3a and for implementing methods for identifying errors in a multi-threaded application of FIG. 4a-4b and in accordance with the embodiments described in the present disclosure. The computer system 500 may generally comprise a processor 591, otherwise referred to as a central processing unit (CPU), an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for tools and programs for identifying errors in a multi-threaded application, in the manner prescribed by the embodiments of the disclosure using the systems of FIGS. 1-3a, wherein the instructions of the computer code 597 may be executed by processor 591 via memory device 595. The computer code 597 may include software or program instructions that may implement one or more algorithms for implementing the methods for identifying errors in a multi-threaded application, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597, 598. The output device 593 displays output from the computer code 597, 598. Either or both memory devices 594 and 595 may be used as a computer usable storage medium (or program storage device) having a computer readable program embodied therein and/or having other data stored therein, wherein the computer readable program comprises the computer code 597, 598. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597, 598) in order to reduce the number of times code must be retrieved from bulk storage while instructions of the computer code 597, 598 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in the figures.

In some embodiments, rather than being stored and accessed from a hard drive, optical disc or other writeable, rewriteable, or removable hardware memory device 594, 595, stored computer program code 598 (e.g., including algorithms) may be stored on a static, non-removable, read-only storage medium such as a Read-Only Memory (ROM) device 599, or may be accessed by processor 591 directly from such a static, non-removable, read-only medium 599. Similarly, in some embodiments, stored computer program code 597 may be stored as computer-readable firmware 599, or may be accessed by processor 591 directly from such firmware 599, rather than from a more dynamic or removable hardware data-storage device 595, such as a hard drive or optical disc.

In some embodiments, the computer system 500 may further be coupled to an Input/output (I/O) interface 117 and a computer data storage unit (for example a data store, data mart or repository). An I/O interface 117 may include any system for exchanging information to or from an input device 592 or output device 593. The input device 592 may be, inter alia, a keyboard, joystick, trackball, touchpad, mouse, sensors, beacons, RFID tags, microphones, biometric input device, camera, timer, etc. The output device 593 may be, inter alia, a printer, a plotter, a display device (such as a computer screen or monitor), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

The I/O interface may allow computer system 500 to store information (e.g., data or program instructions such as program code 597, 598) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect identifying errors in a multi-threaded application. Thus, an embodiment of the present invention discloses a process for supporting computer infrastructure, where the process includes providing at least one support service for at least one of integrating, hosting, maintaining and deploying computer-readable code (e.g., program code 597, 598) in a computer system (e.g., computer 500) including one or more processor(s) 591, wherein the processor(s) carry out instructions contained in the computer code 597 causing the computer system to identify errors in an application. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for identifying errors in a multi-threaded application described in this application. Thus the present invention discloses a process for supporting, deploying and/or integrating computer infrastructure, integrating, hosting, maintaining, and deploying computer-readable code into the computer system 500, wherein the code in combination with the computer system 500 is capable of performing a method of identifying errors in a multi-threaded application.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for identifying errors in a multi-threaded application comprising the steps of:
    running, by a processor, the multi-threaded application being tested for errors;
    generating, by the processor, a thread sequence of the multi-threaded application during runtime;
    storing, by the processor, the thread sequence being generated as a thread sequence representation file;
    analyzing, by the processor, the thread sequence representation file by comparing the thread sequence stored in the thread sequence representation file with a benchmark thread sequence file;
    identifying, by the processor, inconsistencies between the thread sequence representation file and benchmark thread sequence file as a function of the analyzing step, wherein the inconsistencies cause a mis-run thread sequence; and
    reporting, by the processor, the inconsistencies to a user.

2. The method of claim 1, wherein the benchmark thread sequence file is created by the steps comprising:
    running, by the processor, the multi-threaded application in a benchmark mode;
    generating, by the processor a benchmark thread sequence as a function of running the multi-threaded application in benchmark mode;
    capturing, by the processor, a passing result of the benchmark thread sequence; and
    saving, by the processor, the benchmark thread sequence as the benchmark thread sequence file.

3. The method of claim 1, wherein the thread sequence representation file stores a description of the thread sequence as a comparative matrix.

4. The method of claim 3, wherein the comparative matrix describes a relationship between a start time and end time of each thread in the thread sequence in comparison to every remaining thread in the thread sequence.

5. The method of claim 2, wherein the benchmark thread sequence file is a comparative matrix describing a relationship between a start time and an end time of each thread of the benchmark thread sequence in comparison to a start time and end time of every remaining thread in the benchmark thread sequence.

6. The method of claim 1, wherein the inconsistencies identified between the thread sequence representation file and benchmark thread sequence file are a difference in at least one timing relationship between a first thread and a second thread sequenced in both the thread sequence representation file and the benchmark thread sequence file.

7. The method of claim 2, further comprising the steps of:
adding, by the processor, an additional thread to the multi-threaded application;
re-running, by the processor, the multi-threaded application having an additional thread in benchmark mode, as an updated multi-threaded application;
Saving, by the processor, an updated benchmark thread sequence as an updated benchmark thread sequence file; and
identifying, by the processor, inconsistencies between an updated thread sequence representation file comprising the additional thread and the updated benchmark thread sequence file.

8. The method of claim 1, further comprising providing at least one support service for at least one of creating, integrating, hosting, maintaining, and deploying computer-readable program code in a computer system, where the computer-readable program code in combination with the computer system is configured to implement the steps of running, generating, storing, analyzing, identifying and reporting.

9. A computer system, comprising:
a processor;
a memory device coupled to the processor; and
a computer readable storage device coupled to the processor, wherein the storage device contains program code executable by the processor via the memory device to implement a method for identifying errors in a multi-threaded application comprising the steps of:
running, by the processor, the multi-threaded application being tested for errors;
generating, by the processor, a thread sequence of the multi-threaded application during runtime;
storing, by the processor, the thread sequence being generated as a thread sequence representation file;
analyzing, by the processor, the thread sequence representation file by comparing the thread sequence stored in the thread sequence representation file with a benchmark thread sequence file;
identifying, by the processor, inconsistencies between the thread sequence representation file and benchmark thread sequence file as a function of the analyzing step, wherein the inconsistencies cause a mis-run thread sequence; and
reporting, by the processor, the inconsistencies to a user.

10. The computer system of claim 9, wherein the benchmark thread sequence file is created by the steps comprising:
running, by the processor, the multi-threaded application in a benchmark mode;
generating, by the processor a benchmark thread sequence as a function of running the multi-threaded application in benchmark mode;
capturing, by the processor, a passing result of the benchmark thread sequence; and
saving, by the processor, the benchmark thread sequence as the benchmark thread sequence file.

11. The computer system of claim 9, wherein the thread sequence representation file stores a description of the thread sequence as a comparative matrix describing a relationship between a start time and end time of each thread in the thread sequence in comparison to every remaining thread in the thread sequence.

12. The computer system of claim 10, wherein the benchmark thread sequence file is a comparative matrix describing a relationship between a start time and an end time of each thread of the benchmark thread sequence in comparison to a start time and end time of every remaining thread in the benchmark thread sequence.

13. The computer system of claim 9, wherein the inconsistencies identified between the thread sequence representation file and benchmark thread sequence file are a difference in at least one timing relationship between a first thread and a second thread sequenced in both the thread sequence representation file and the benchmark thread sequence file.

14. The computer system of claim 9, further comprising the steps of:
adding, by the processor, an additional thread to the multi-threaded application;
re-running, by the processor, the multi-threaded application having an additional thread in benchmark mode, as an updated multi-threaded application;
Saving, by the processor, an updated benchmark thread sequence as an updated benchmark thread sequence file; and
identifying, by the processor, inconsistencies between an updated thread sequence representation file comprising the additional thread and the updated benchmark thread sequence file.

15. A computer program product comprising:
one or more computer readable hardware storage devices having computer readable program code stored therein, said program code containing instructions executable by one or more processors to implement a method for identifying errors in a multi-threaded application comprising the steps of:
running, by the processor, the multi-threaded application being tested for errors;
generating, by the processor, a thread sequence of the multi-threaded application during runtime;
storing, by the processor, the thread sequence being generated as a thread sequence representation file;
analyzing, by the processor, the thread sequence representation file by comparing the thread sequence stored in the thread sequence representation file with a benchmark thread sequence file;
identifying, by the processor, inconsistencies between the thread sequence representation file and benchmark thread sequence file as a function of the analyzing step, wherein the inconsistencies cause a mis-run thread sequence; and
reporting, by the processor, the inconsistencies to a user.

16. The computer program product of claim 15, wherein the benchmark thread sequence file is created by the steps comprising:
running, by the processor, the multi-threaded application in a benchmark mode;
generating, by the processor a benchmark thread sequence as a function of running the multi-threaded application in benchmark mode;

capturing, by the processor, a passing result of the benchmark thread sequence; and saving, by the processor, the benchmark thread sequence as the benchmark thread sequence file.

17. The computer program product of claim 15, wherein the thread sequence representation file stores a description of the thread sequence as a comparative matrix describing a relationship between a start time and end time of each thread in the thread sequence in comparison to every remaining thread in the thread sequence.

18. The computer program product of claim 16, wherein the benchmark thread sequence file is a comparative matrix describing a relationship between a start time and an end time of each thread of the benchmark thread sequence in comparison to a start time and end time of every remaining thread in the benchmark thread sequence.

19. The computer program product of claim 15, wherein the inconsistencies identified between the thread sequence representation file and benchmark thread sequence file are a difference in at least one timing relationship between a first thread and a second thread sequenced in both the thread sequence representation file and the benchmark thread sequence file.

20. The computer program product of claim 15, further comprising the steps of:

adding, by the processor, an additional thread to the multi-threaded application;

re-running, by the processor, the multi-threaded application having an additional thread in benchmark mode, as an updated multi-threaded application;

Saving, by the processor, an updated benchmark thread sequence as an updated benchmark thread sequence file; and identifying, by the processor, inconsistencies between an updated thread sequence representation file comprising the additional thread and the updated benchmark thread sequence file.

\* \* \* \* \*